United States Patent [19]

Coulson

[11] 4,329,811
[45] May 18, 1982

[54] METAL GRAPE STAKE
[75] Inventor: Don J. Coulson, Huntington Beach, Calif.
[73] Assignee: North Star Company, Inc., Gardena, Calif.
[21] Appl. No.: 202,782
[22] Filed: Oct. 31, 1980
[51] Int. Cl.³ .............................................. A01G 17/06
[52] U.S. Cl. ......................................... 47/46; 403/263
[58] Field of Search ...................... 47/44–47; 256/65, 68–70; 403/263

[56] References Cited
U.S. PATENT DOCUMENTS
3,791,070 2/1974 Roberts ..................................... 47/46

*Primary Examiner*—Robert E. Bagwill
*Attorney, Agent, or Firm*—Keith D. Beecher

[57] ABSTRACT

An all-metal grape stake is provided that includes an elongated metal upright member which is rolled to have a V-shaped cross-section with flanges extending along its two edges. The grape stake also includes a cross-arm in the form of a metal strip which extends across the upper end of the upright member and which has a bent-over upper edge extending across the top of the upright member. A V-shaped bracket is mounted in the center of the cross-arm, and this bracket receives the upper end of the upright member. In assembling the grape stake of the invention, the upright member is first driven into the ground, and the cross-arm is dropped over the upper end of the upright member until its upper edge engages the top of the upright member, with the upper end of the upright member being received in the bracket. The cross-arm is then turned about the horizontal axis of the upright member until one flange of the upright member engages the apex of the bracket and the other flange snaps into slots in the cross-arm, so that the cross-arm is firmly held on the upper end of the upright member.

5 Claims, 3 Drawing Figures

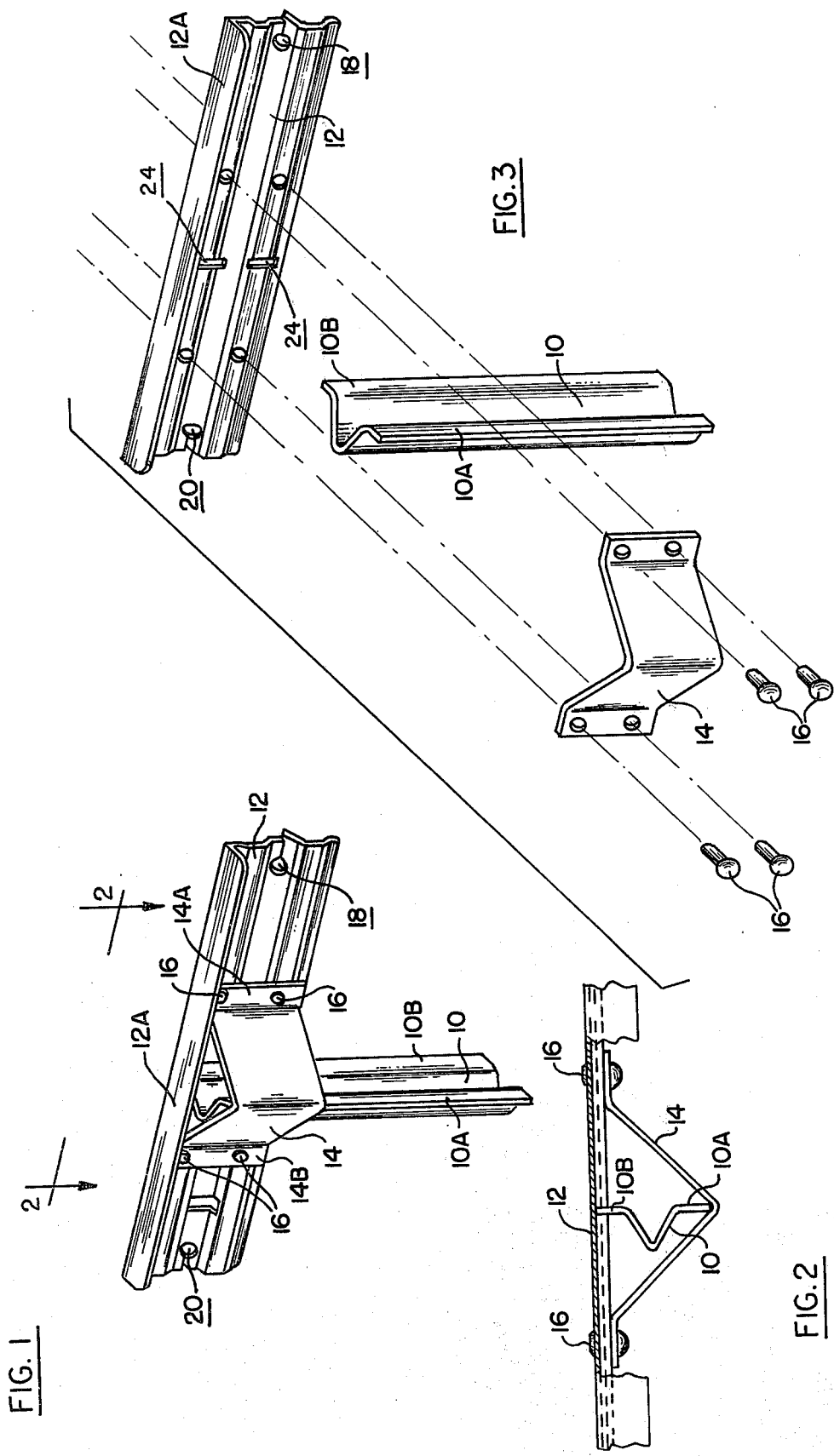

METAL GRAPE STAKE

BACKGROUND

It is usual in the grape growing industry to grow grapeview on trellises. For many years the trellises have taken the form of wires strung between wooden stakes. However, the wooden stakes deteriorate in time, and it is time consuming and expensive to replace them.

The present invention provides a simple and inexpensive all-metal stake for supporting the trellis wires. The stake of the invention is easy to fabricate, and is also easy to install in the ground, and to assemble without requiring tools. Moreover, the grape stake of the invention lasts indefinitely.

BRIEF DESCRIPTION OF THE DRAWING

FIG. 1 is a perspective representation of a grape stake representing one embodiment of the invention;

FIG. 2 is a top plan view of the grape stake of FIG. 1, taken along the line 2—2 of FIG. 1, and with a portion of the upper edge of the cross-arm of the grape stake removed to reveal the manner in which the upright member is supported in the bracket; and FIG. 3 is a detached view showing the various components of the grape stake of FIG. 1.

DETAILED DESCRIPTION OF THE ILLUSTRATED EMBODIMENT

The grape stake shown in FIG. 1 includes an elongated upright member 10 which is formed of appropriate metal, such as galvanized iron, and which may be rolled to the illustrated V-shaped cross-section, and with the two flanges 10A and 10B extending along its edges.

The upper end of the upright member 10 is received in a V-shaped bracket 14 which is secured to a cross-arm 12 at an intermediate position on the cross-arm. Cross-arm 12 may also be formed of appropriate metal, such as galvanized iron, and it has the form of a strip, as shown, with a bent-over upper edge 12A. Bracket 14 is secured to the cross-arm 12 by appropriate rivets, or other fasteners 16.

The cross-arm 12 has slots 18 and 20 at its opposite ends to receive the trellis wires, and it also has slots 24 within the confines of bracket 14 to receive the flange 10B of the upright member 10.

The various components of the grape stake shown in the drawing may all be formed, for example, of galvanized iron, by a simple rolling and forming process.

To assemble the grape stake, the upright member 10B is first driven into the ground, and the cross-arm 12 is dropped over the upper end of the upright member until the top of the upright member engages the bent-over upper edge 12A of the cross-arm. The cross-arm 12 is then turned about the longitudinal axis of upright member 10B until flange 10A is received in the apex of the bracket 14, and flange 10B is received in the slots 24 in the cross-arm. The resilient nature of the upright member 10 causes it to be firmly and rigidly held within the bracket 14 and slots 24. Accordingly, the cross-arm 12 is snapped into place on the upper end of upright member 10 by a simple twisting action, and without the necessity for any tools.

It will be appreciated that while a particular embodiment of the invention has been shown and described, modifications may be made. It is intended in the claims to cover all modifications which come within the spirit and scope of the invention.

What is claimed is:

1. A grape stake, and the like, including an elongated upright member adapted to be driven into the ground, said upright member having a V-shaped cross-section and having first and second flanges extending along the respective edges thereof; a cross-arm having at least one transverse slot therein intermediate its ends, said cross-arm having a vertical portion extending along its length, and a horizontal portion engaging the top of the upright member; and a bracket having a V-shaped cross-section mounted on said cross-arm adjacent to said slot for receiving the upper end of said upright member, said bracket having at height slightly less than the width of said top of said upright member for holding the upright member firmly against the surface of said cross-arm with the first flange being received in said slot and with the second flange being received at the apex of said V-shaped bracket.

2. The grape stake defined in claim 1, in which the upright member and cross-arm and bracket are all formed of metal.

3. The grape stake defined in claim 2, in which the cross-arm is in the form of an elongated metal strip extending across the upper end of the upright member, and having a turned-over upper edge forming said horizontal portion engaging the top of the upright member.

4. The grape stake defined in claim 3, in which the cross-arm has at least one slot therein to receive a trellis wire.

5. The grape stake defined in claim 3, in which the cross-arm has slots therein at the respective ends thereof to receive corresponding trellis wires.

* * * * *